United States Patent [19]

Sato et al.

[11] Patent Number: 5,373,489

[45] Date of Patent: Dec. 13, 1994

[54] EXTERNAL STORAGE DEVICE WITH A PLURALITY OF RECORDING/REPRODUCING DRIVE UNITS AND A PLURALITY OF STORAGE RACKS STACKED IN A COMMON PLANE

[75] Inventors: Kouichi Sato; Takehiro Ohashi, both of Tokyo, Japan

[73] Assignee: NEC Corporation, Tokyo, Japan

[21] Appl. No.: 904,510

[22] Filed: Jun. 25, 1992

[30] Foreign Application Priority Data

Jun. 26, 1991 [JP] Japan .................................. 3-181874

[51] Int. Cl.$^5$ ........................ G11B 17/22; G11B 15/68
[52] U.S. Cl. .................... 369/36; 360/98.04; 360/97.01; 369/292
[58] Field of Search .................. 369/34, 36, 292; 360/98.06, 98.04, 97.01, 97.02

[56] References Cited

U.S. PATENT DOCUMENTS

| | | | |
|---|---|---|---|
| 4,817,071 | 3/1989 | Carlson et al. | 360/98.02 X |
| 5,033,038 | 7/1991 | Kobayashi et al. | 369/36 |
| 5,036,503 | 7/1991 | Tomita | 369/36 |
| 5,146,375 | 9/1992 | Satoh et al. | 360/92 |

FOREIGN PATENT DOCUMENTS 0151893 7/1986 Japan .................. 360/97.02
4019891 1/1992 Japan .................. 360/97.02

OTHER PUBLICATIONS

Bakken et al, IBM Technical Disclosure Bulletin, Mar. 1977, pp. 3846–3847.
IBM Technical Disclosure Bulletin, May 1986, p. 5403.

Primary Examiner—Edward K. Look
Assistant Examiner—Hoang Nguyen
Attorney, Agent, or Firm—Sughrue, Mion, Zinn, Macpeak & Seas

[57] ABSTRACT

An external storage device having racks for receiving cartridges each accommodating a storage medium therein, drive units capable of recording and reproducing data from the storage medium, a mechanism for transporting the cartridge, and a mechanism for loading the cartridge. A mechanical section and a control section are disposed in a rectangular parallelepiped housing and isolated from each other, except for a portion for ventilation, by a partition. An air inlet is formed in the housing adjacent to the mechanical section and provided with a filter and suction fans. An air outlet is formed in the housing adjacent to the control section and provided with an exhaust fan. The drive units and racks have substantially the same height and same width and are arranged face-to-face at both sides of the transport mechanism.

7 Claims, 7 Drawing Sheets

EXTERNAL STORAGE DEVICE WITH A PLURALITY OF RECORDING/REPRODUCING DRIVE UNITS AND A PLURALITY OF STORAGE RACKS STACKED IN A COMMON PLANE

BACKGROUND OF THE INVENTION

The present invention relates to an external storage device to be attached to a host and, more particularly, to an optical disk device having a rack for receiving cartridges each accommodating an optical disk medium therein and a drive unit for recording and reproducing data from the disk medium.

Generally, an optical disk device includes a rack capable of accommodating a plurality of cartridges in a flat position one above another while spacing them apart by a predetermined distance. A drive unit is disposed below the rack for recording or reproducing data in or from the optical disk medium accommodated in the cartridge, as desired. A transport mechanism adjoins the rack and drive unit to convey the cartridge horizontally between the rack and the drive unit, turns over the cartridge, and transports the cartridge upward or downward. The rack, drive unit and transport mechanism are disposed in a rectangular housing. A designated one of the cartridges is conveyed from the rack to the drive unit by the transport mechanism while being turned over, if necessary. As the drive unit completes a recording or reproducing operation with the cartridge, the cartridge is again transported from the drive device to the rack by the transport mechanism.

It is a common practice with the above-described type of optical disk device to provide only one rack and only one or two drive units in the housing. This brings about a problem that the number of cartridges to be stored and the recording and reproducing ability cannot be increased without resorting to extra disk devices. This is also true even when the desired increase in the number of cartridges to be stored or in the recording and reproducing ability is small. As a result, the conventional device lacks efficiency in respect of cost, performance and space requirement.

SUMMARY OF THE INVENTION

It is therefore an object of the present invention to provide an external storage device allowing the number of cartridges to be accommodated and the recording and reproducing ability to be increased without resorting to extra devices.

An external storage device operable with a plurality of cartridges each accommodating a storage medium of the present invention comprises recording and reproducing units for recording and reproducing data from the storage medium and each having an opening for the ingress and egress of the storage medium, a plurality of racks each for receiving a plurality of cartridges via an opening thereof, and an arrangement for connecting the recording and reproducing units and racks such that the openings of the recording and reproducing units and the openings of the racks lie in substantially the same plane parallel to a direction in which the recording and reproducing units and racks are arranged.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
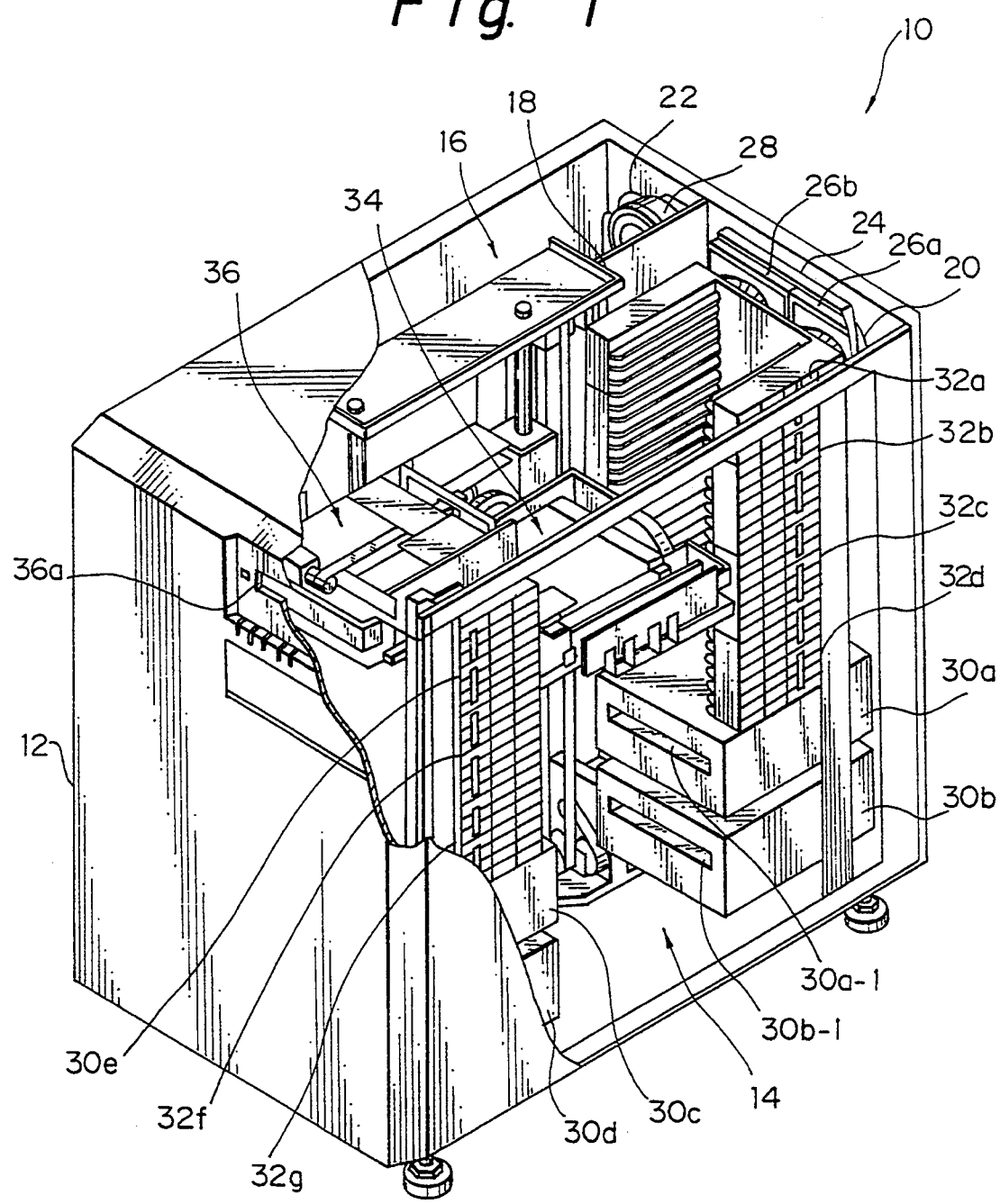
FIG. 1 is a partly sectional perspective view showing an external storage device embodying the present invention and implemented as an optical disk device.

Referring to FIG. 1 of the drawings, an external storage device embodying the present invention is shown and implemented as an optical disk device. As shown, the storage device, generally 10, has a housing 12 accommodating a mechanical section 14 and a control section 16 therein. A partition 18 isolates the mechanical section 14 and control section 16 from each other, except for a portion for ventilation. An air inlet 20 and an air outlet 22 are formed through the casing 12 and adjoin the mechanical section 14 and the control section 16, respectively. A filter 24 and suction fans 26a and 26b are associated with the air inlet 20 while an exhaust fan 28 is associated with the air outlet 22.

The mechanical section 14 includes drive units 30a-30d each being capable of recording and reproducing data from an optical disk medium accommodated in a cartridge, not shown. Cartridges, not shown, are stored in racks 32a-32g. A transport mechanism 34 transports the cartridges between the drive units 30a-30d and the racks 32a-32g. A loading mechanism 36 is operable to load a cartridge in the housing 12. The drive units 30a-30d are respectively formed with openings 30a-1 to 30d-1 for the ingress and egress of a cartridge. The drive units 30a-30d and racks 32a-32g have substantially the same height and same width. The drive units 30a and 30b and the drive units 30c and 30d are stacked together and located face-to-face at both sides of the transport mechanism 34. The racks 32a-32d and the racks 32e-32g are stacked together in the same arrangement as the drive units 30a-30d. The loading mechanism 36 is located above the racks 32a-32g and includes an opening 36a for the ingress and egress of a cartridge.

The control section 16 is connected to the mechanical section 14 and a host, not shown, and controls the mechanical section 14 in response to commands from the host. Also, the control section 16 processes a signal to be recorded in or reproduced from a disk medium and transfers the processed signal to designated one of the drive units 30a-30d or to the host.

Figure 2:
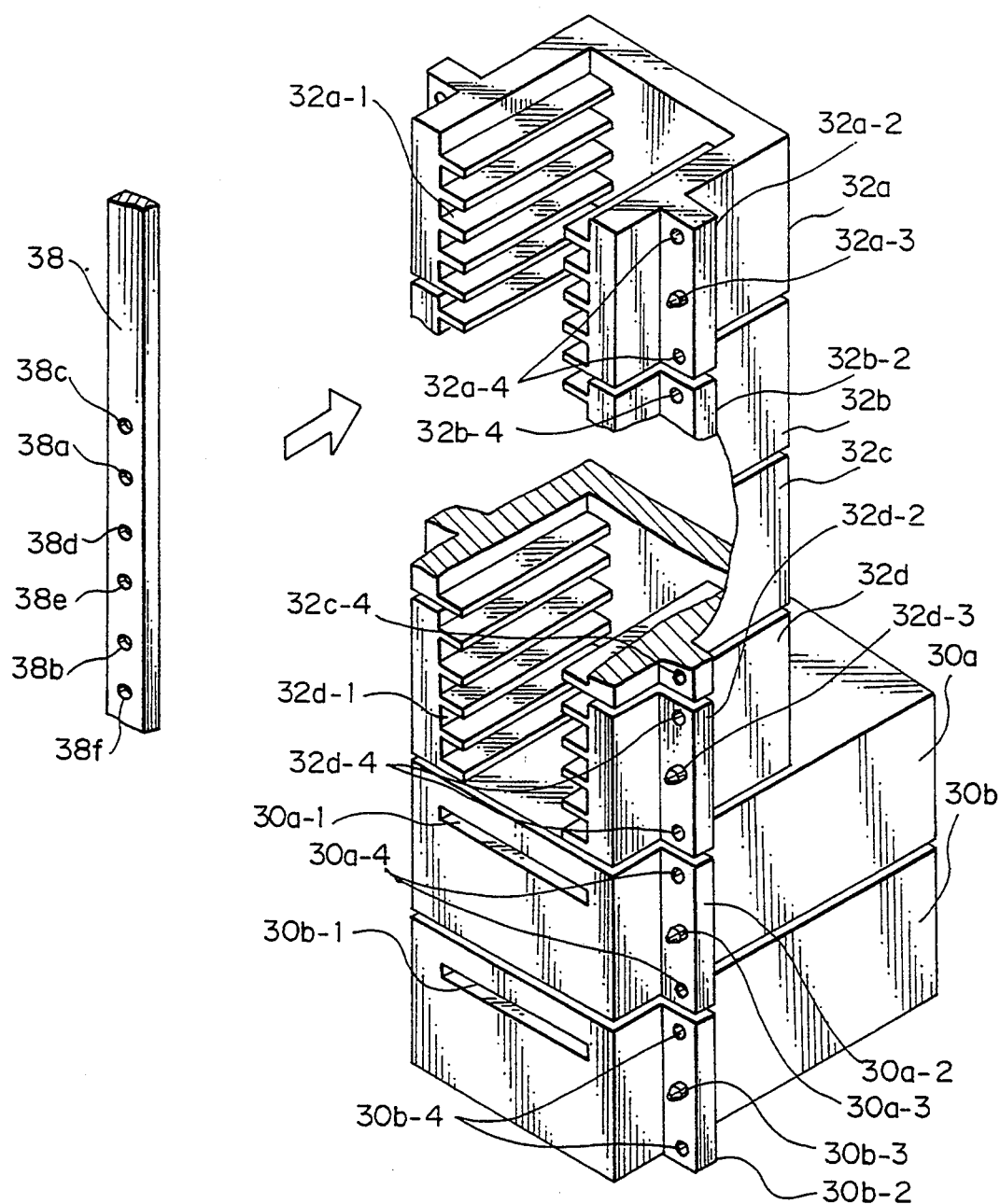
FIG. 2 is a partly sectional perspective view of drive units and racks included in the embodiment.
Figure 3:
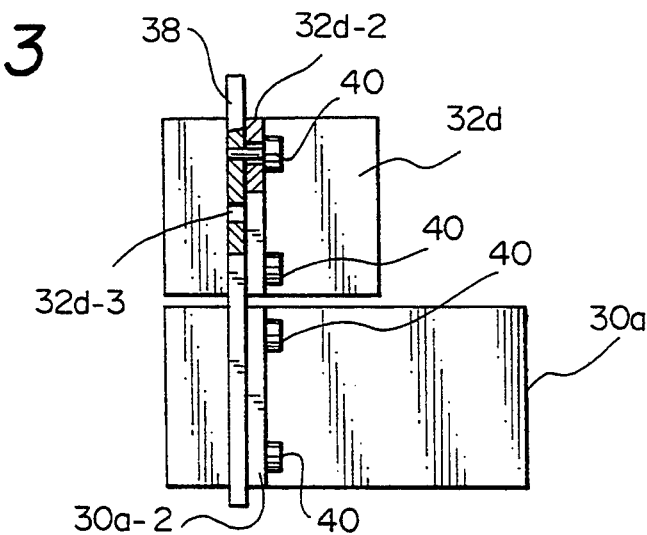
FIG. 3 shows the drive units and racks of FIG. 2 in an assembled condition.

FIG. 2 shows the construction of the drive units 30a-30d and racks 32a-32g. FIG. 3 shows the drive units 30a-30d and racks 32a-32g in an assembled condition. As shown in FIG. 2, all of the drive units 30a and 30b and racks 32a–32d have substantially the same height and same width. The drive units 30a and 30b each has the previously mentioned opening 30a-1 or 30b-1 and a connecting portion 30a-2 or 30b-2 extending out from the casing thereof. The connecting portions 30a-2 and 30b-2 are respectively provided with guide studs 30a-3 and 30b-3 and holes 30a-4 and 30b-4. The racks 32a–32d have, respectively, openings 32a-1 to 32d-1 (32b-1 and 32c-1 are not shown) on the front of their casings and connecting portions 32a-2 to 32d-2 (32c-2 is not shown) on the side of the casings. The connecting portions 32a-2 to 32d-2 are respectively provided with guide studs 32a-3 to 32d-3 (32b-3 and 32c-3 are not shown) and holes 32a-4 to 32d-4. The drive units 30a and 30b and racks 32a–32d are stacked and then connected together by a tie plate 38 at the side thereof. As shown in FIG. 2, the tie plate 38 is formed with threaded holes 38a–38f.

As shown in FIG. 3, to connect the drive unit 30a and rack 32d, for example, the tie plate 38 is attached to the drive unit 30a and rack 32d to receive the guide shafts 30a-3 and 32d-3 in the holes 38a and 38b thereof, thereby positioning the drive unit 30a and rack 32d. Subsequently, screws 40 are driven into the threaded holes 38c–38f of the tie plate 38 via the holes 30a-4 of the connecting portion 30a-2 and the holes 32d-4 of the connecting portion 32d-2. As a result, the drive unit 30a and rack 32d are affixed to each other by the tie plate 38. The disk drive 39b and racks 32a–32c are connected together in the same manner.

Figure 4:
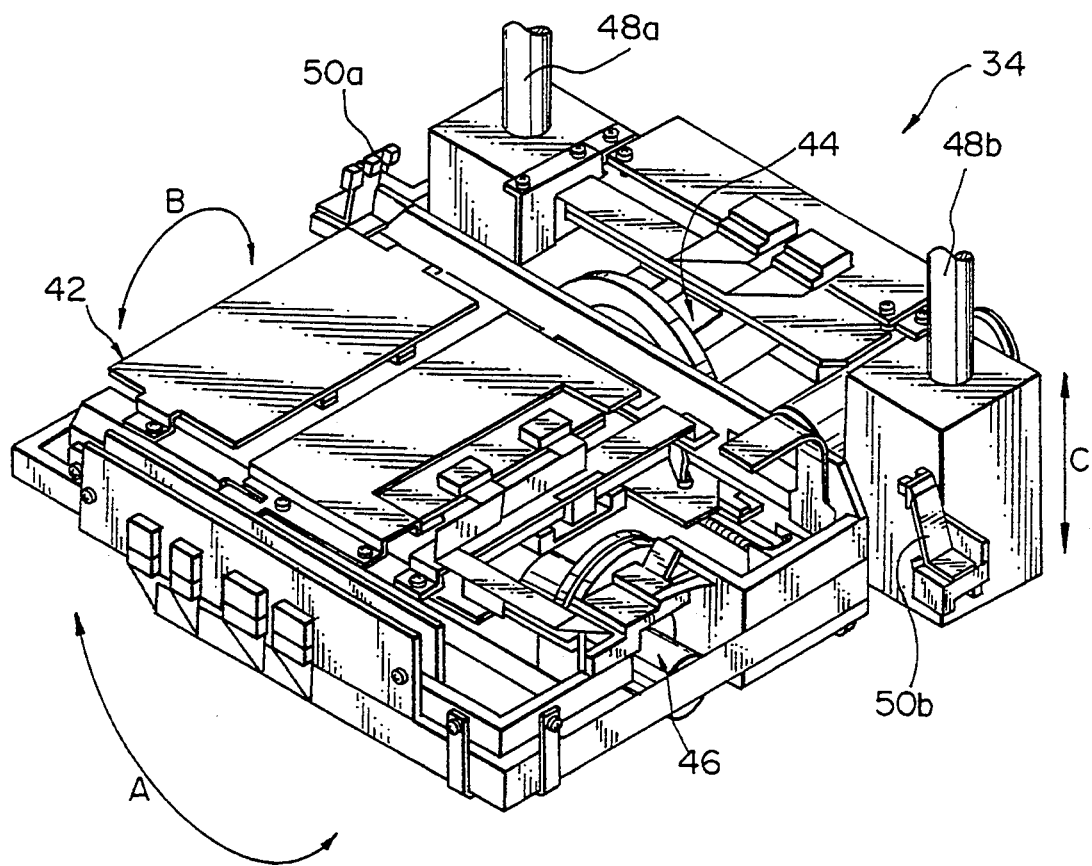
FIG. 4 is a perspective view showing a transport mechanism included in the embodiment.

FIG. 4 shows the construction of the transport mechanism 34, FIG. 1. As shown, the transport mechanism 34 includes a picker mechanism 42 having an arrangement for holding a cartridge. The picker mechanism 42 is rotatable in a direction indicated by an arrow A when driven by a first drive section 44 or in a direction B when driven by a second drive section 46. Further, the picker mechanism 42 is movable in a direction C along guide rods 48a and 48b when driven by a third drive section which will be described. The rotation of the picker mechanism 42 in the direction A is sensed by sensors 50a and 50b.

Figure 5:
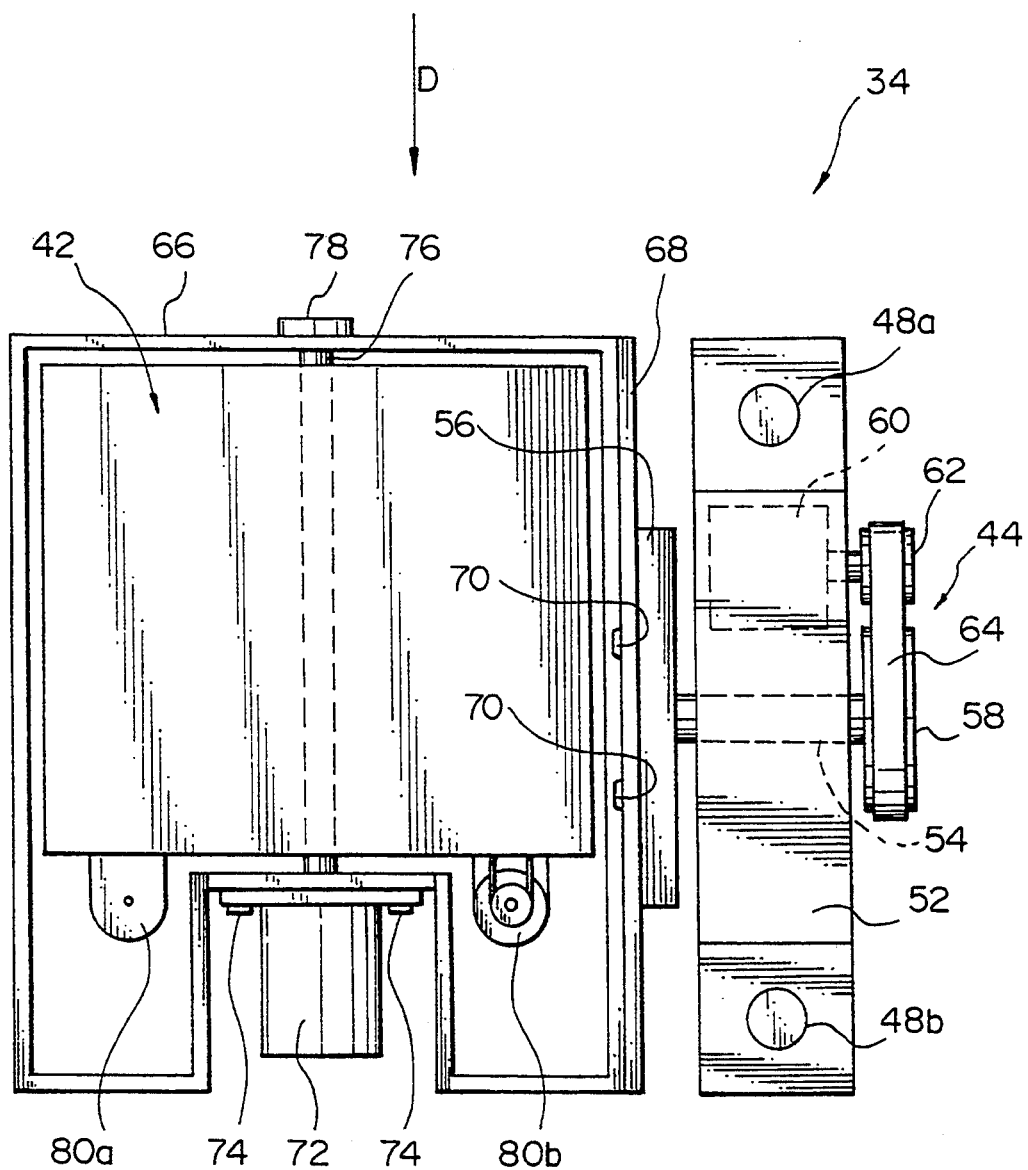
FIG. 5 is a top plan view of the transport mechanism.

Specifically, as shown in FIG. 5, the guide rods 48a and 48b of the transport mechanism 34 extend parallel with each other. A support block 52 is mounted on and movable along the guide rods 48a and 48b. A shaft 54 is rotatably supported by substantially the intermediate portion of the support block 52 and perpendicular to the guide rods 48a and 48b. The shaft 54 carries a disk 56 on one end and a pulley 58 on the other end. A motor 60 is mounted on the support block 52 and drivably connected to a pulley 62. The pulleys 58 and 62 are connected to each other by a belt 64. In this configuration, as the motor 60 is rotated, it rotates the disk 56 via the belt 64 and shaft 54. A frame 66 is fastened to the disk 56 by screws 70 at a fixing portion 68 thereof. A motor 72 is affixed to the frame 66 by screws 74 to drive a shaft 76. The end of the shaft 76 remote from the motor 72 is journalled to the frame 66 by a bearing 78. The shaft 76 extends parallel to the lengthwise direction of the fixing portion 68 of the frame 66.

The picker mechanism 42 is accommodated in the frame 66 and affixed to the shaft 76, i.e., the shaft 76 extends through the center of the mechanism 42. The picker mechanism 42 picks up or ejects a disk medium, as needed. In the illustrative embodiment, the picker mechanism 42 has a two-stage configuration for picking up or ejecting two disk media at a time. Motors 80a and 80b are included in the picker mechanism 42 to effect the pick-up and ejection of a disk medium. For details of the picker mechanism 42, a reference may be made to pending U.S. patent application Ser. No. 07/780,398 now U.S. Pat. No. 5,146,375.

Figure 6A:
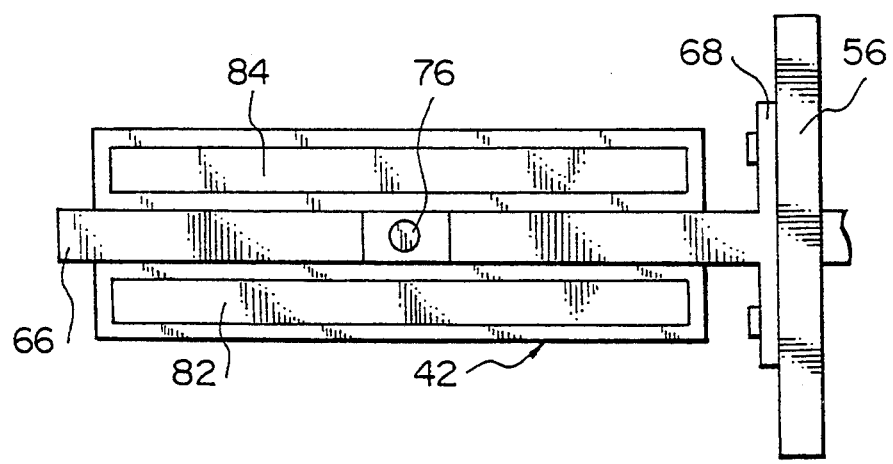
FIGS. 6A and 6B demonstrate the operation of a picker mechanism shown in FIG. 5.
Figure 6B:
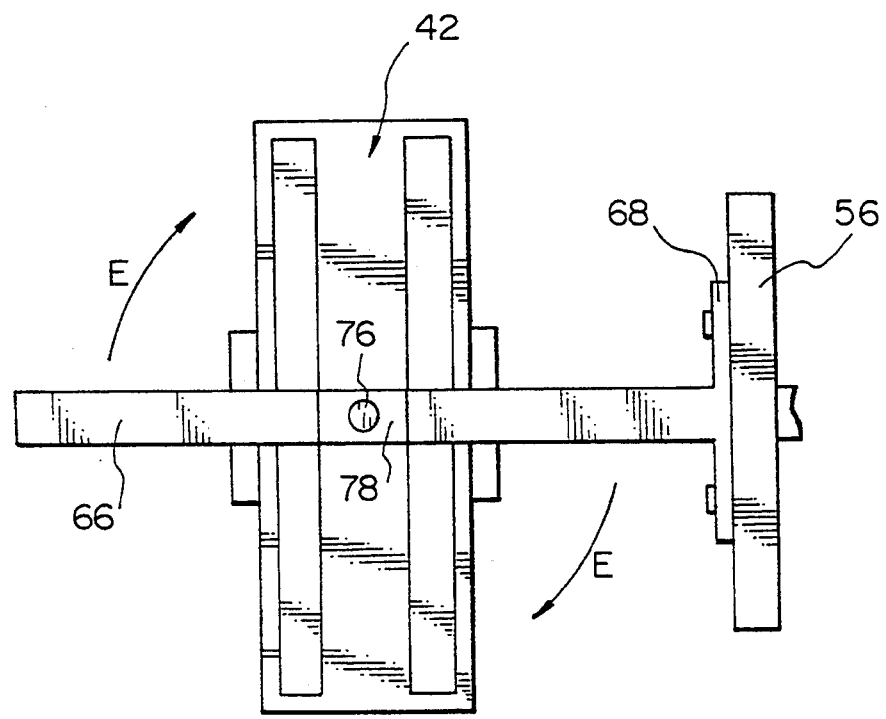

FIG. 6A shows the picker mechanism 42 in an elevation as seen in a direction D of FIG. 5. In the condition of FIG. 6A, the picker mechanism 42 is ready to pick up or eject a disk medium. As shown, the mechanism 42 has two parallel openings 82 and 84. In this particular condition, the frame 66 is located between the openings 82 and 84 so as not to interfere with the pick-up or ejection of a disk medium. When the motor 72 is rotated, it rotates the shaft 76 with the result that the mechanism 42 is rotated in a direction indicated by an arrow E in FIG. 6B. When the mechanism 42 is rotated 180 degrees in the direction E, a disk medium or media accommodated therein are turned over. Then, the openings 82 and 84 are replaced with each other with respect to their position. Further, when the previously mentioned disk 56 is rotated, it changes the pick-up or ejection direction of the mechanism 42, i.e., it reverses the pick-up or ejection direction when rotated 180 degrees.

Figure 7A:
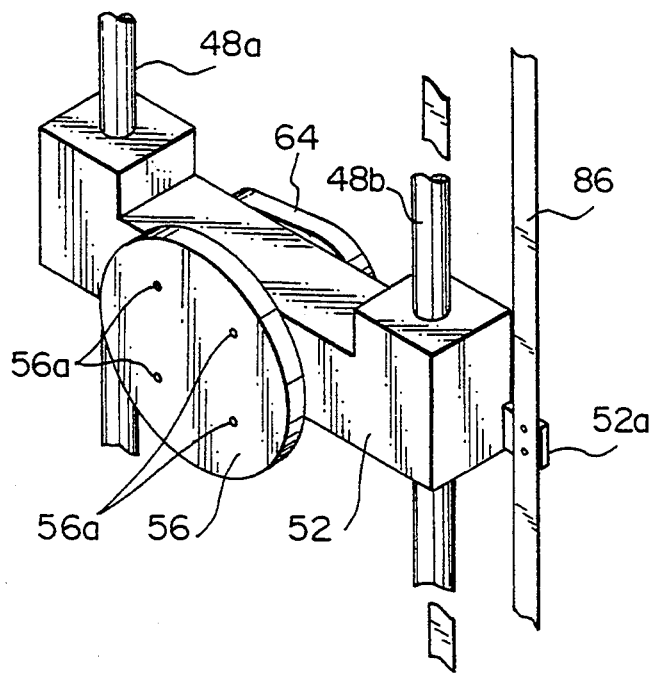
FIGS. 7A and 7B are perspective views showing a drive arrangement associated with the transport mechanism shown in FIG. 4.

FIG. 7A shows the support block 52 with the disk 56 from which the frame 66 is removed. As shown, threaded holes 56a are formed through the disk 56 for mating with the screws 70. An endless belt 86 is affixed to a lug 52a extending out from the support block 52 and is parallel to the guide rods 48a and 48b. The belt 86 has the uppermost portion thereof passed over an idle pulley, not shown, and has the lowermost portion passed over a pulley which is driven by a motor, as will be described hereinafter.

Figure 7B:
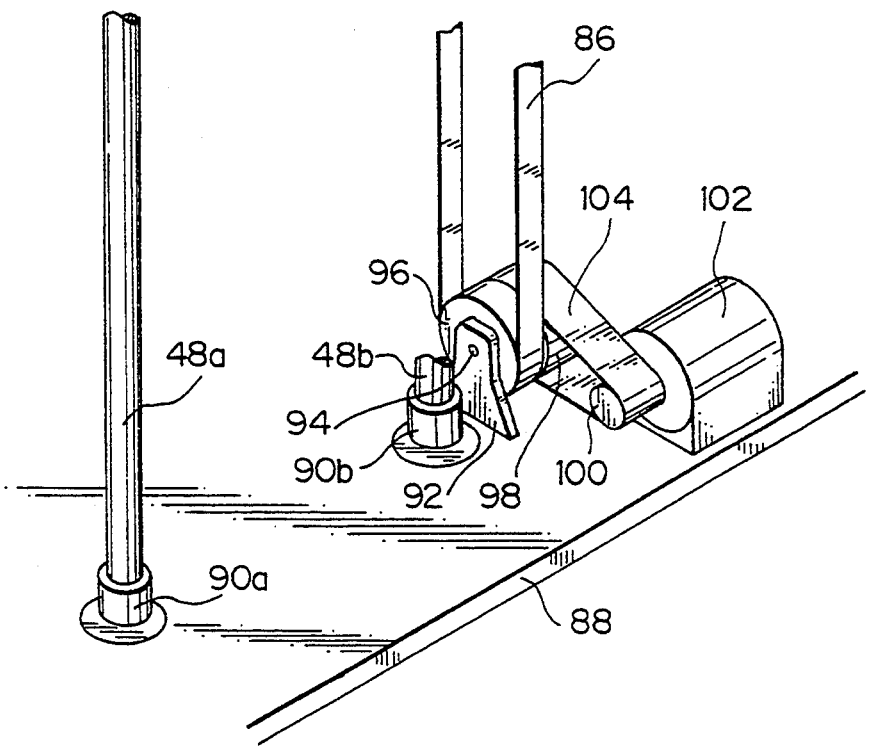

The lowermost portion of the belt 86 is shown in FIG. 7B together with a drive arrangement. A shown, rod supports 90a and 90b are affixed to a base 88 for supporting the guide rods 48a and 48b, respectively. A bracket 92 is provided on the base 88 while a shaft 84 is affixed to the bracket 92. Pulleys 96 and 98 are connected together and rotatably mounted on the shaft 94, so that they are rotatable integrally with each other. A motor 102 is mounted on the base 88 and drivably connected to a pulley 100 which is connected to the pulley 98 by a belt 104. In this construction, when the motor 102 is rotated, it drives the belt 86 via the pulley 100, belt 104, pulley 98, and pulley 96. As a result, the support block 52 affixed to the belt 86 is moved along the guide rods 48a and 48b.

Figure 8:
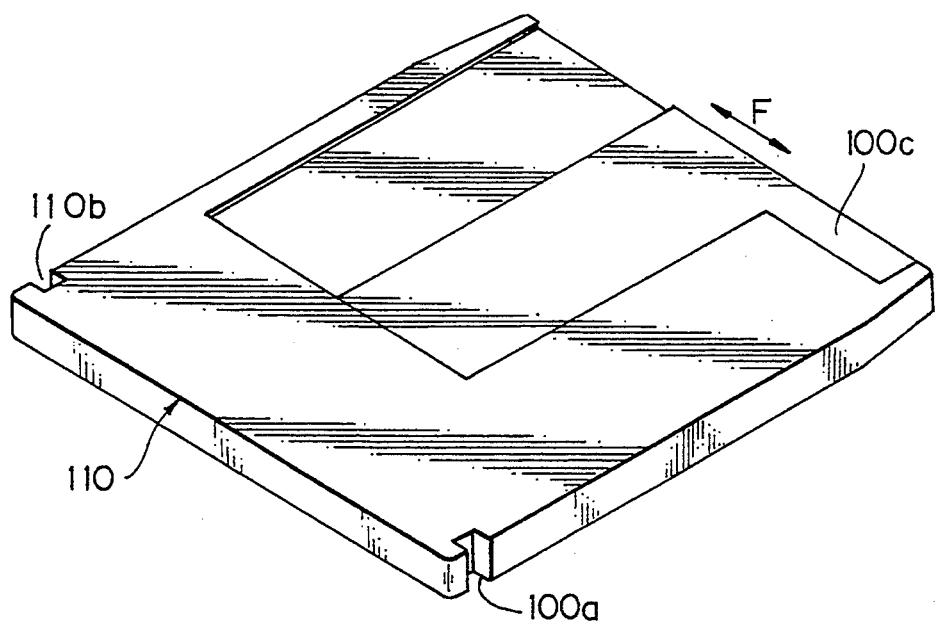
FIG. 8 is a perspective view showing a cartridge applicable to the embodiment.

FIG. 8 shows a cartridge 110 applicable to the optical disk device 10 having the above construction. The cartridge 110 accommodates an optical disk medium, not shown, therein and has notches 110a and 110b to be picked up by the picker mechanism 42. A shutter 110c is provided on the cartridge 110 and movable in a direction F for allowing data to be recorded in or reproduced from the medium.

Figure 9:
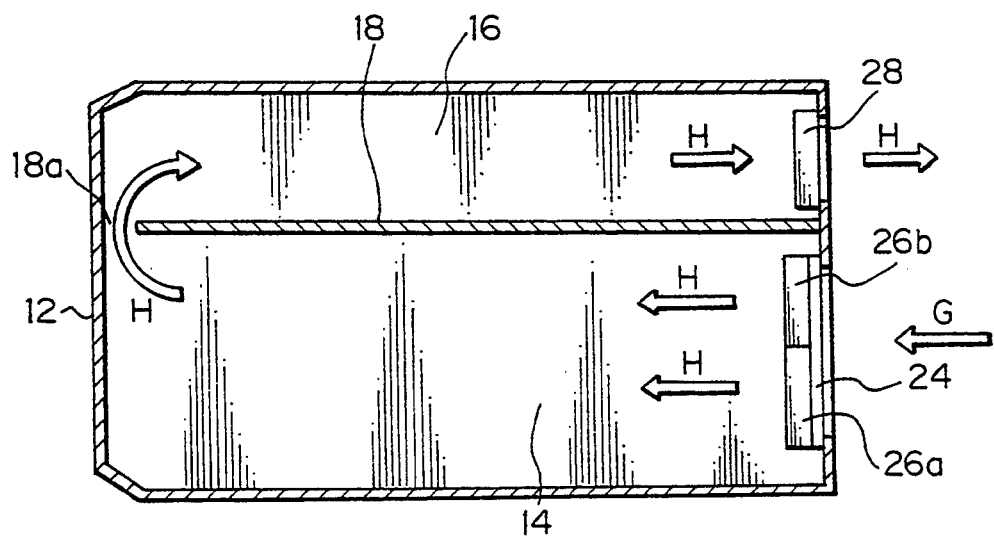
FIG. 9 schematically shows a stream of air generated in a housing included in the embodiment.

FIG. 9 schematically shows a stream of air generated in the housing 12. As shown, the suction fans 26a and 26b suck clean air from the outside of the housing 12 via the filter 24 to thereby cool the mechanical section 14. The stream of air which cooled the mechanical section 14 is introduced into the control section 16 via a portion for ventilation 18a formed in the partition 18. After cooling the control section 16, the air is driven out of the housing 12 by the exhaust fan 28. Since the heat to be generated in the mechanical section 14 is far smaller in amount than the heat to be generated by the control section 16, the stream of air can sufficiently cool the control section 16 even after cooling the mechanical section 14. The stream of air is represented by arrows G and H in the figure. The suction fans 26a and 26b and exhaust fan 28 start operating in response to the turn-on of the power supply of the device.

In operation, when the cartridge 110 is inserted into the loading mechanism 36 via the opening 36a, the transport mechanism 34 transports it from the loading mechanism 36 to one of the racks 32a–32g designated by the host. As a result, the cartridge 110 is received in the rack of interest. Subsequently, the transport mechanism 34 conveys the cartridge 110 from the designated rack to one of the drive units 30a–30d also designated by the host, under the control of the control section 16. Specifically, the host designates a position for storing the cartridge 110, the front or the rear of the cartridge for recording or reproducing data, and one of the drive units 30a–30d to operate. The control section 16 controls the transport mechanism 34 in response to such information sent from the host.

Assume that the host designated one of the cartridges 110 stored in the rack 32f, and the drive unit 30b. Then, the transport mechanism 34 moves to the designated position of the rack 32f, holds the cartridge 110 of interest by the picker mechanism 42, and then removes it from the rack 32f. The transport mechanism 34 holding the cartridge 110 rotates the picker mechanism 42 in the front-and-rear direction by the drive section 44, moves to the drive unit 30b, and then inserts the cartridge 110 into the drive unit 30b via the opening 30b-1. At this instant, if data is to be recorded on the side of the cartridge 110, the transport mechanism 34 turns over the picker mechanism 42 by the drive section 46. As the drive unit 30b fully records or reproduces data in or from the cartridge 110, it ejects the cartridge 110 via the opening 30b-1. The transport mechanism 34 again holds the ejected cartridge 110 by the picker mechanism 42, moves to the position of the rack 32f where the cartridge 110 should occupy, and then returns it into the rack 32f via the opening 32f-1. In this case, the transport mechanism 34 rotates the picker mechanism 32 in the front-and-rear direction by the drive section 44 and then returns to the rack 32f. Further, the transport mechanism 32 turns over the picker mechanism 42 by the drive section 46, if necessary. Assuming that data should be recorded in the cartridge 110 by the drive unit 30b, the host sends a record signal to the drive unit 30b via the control section 16. On the other hand, to reproduce data from the cartridge 110, a signal read out of the cartridge 110 by the drive unit 30b is sent to the host via the control section 16. It is noteworthy that data can be recorded in or reproduced from the same number of cartridges 110 as the drive units 30a–30d in parallel. During the above operation, both the mechanical section 14 and the control section 16 are efficiently cooled by the fans 26a, 26b and 28, as stated earlier.

In summary, the embodiment shown and described connects the drive units 30a–30d and racks 32a–32g having substantially the same height and same width by the tie plate 38 such that, the openings of the drive units 30a–30d and those of the racks 32a–32g lie in substantially the same plane. This allows the drive units 30a–30d and racks 32a–32g to be freely combined to implement a desired storage capacity or a desired recording and reproducing ability. Hence, with the embodiment, it is possible to increase the number of cartridges 110 to accommodate and the recording and reproducing ability without resorting to extra devices, thereby enhancing the efficiency in respect of cost, performance and space requirement.

Further, the transport mechanism 34 with the front-and-rear rotating function conveys the cartridge 110 between the drive units 30a–30d and racks 32a–32g which are arranged face-to-face. This further enhances the above-described advantages.

The mechanical section including the drive units 30a–30d, racks 32a–322g and transport mechanism 34 and the control section 16 are isolated from each other by the partition 18. The suction fans 26a and 26b suck air from the outside while the exhaust fan 28 discharges the air to the outside, generating stream of air through the mechanical section 14 and control section 16. The partition 18, therefore, not only facilitates maintenance and adjustment work but also promotes efficient cooling of the device, thereby freeing the device from malfunctions.

Various modifications will become possible for those skilled in the art after receiving the teachings of the present disclosure without departing from the scope thereof. For example, while the embodiment has concentrated on an optical disk device using an optical disk medium, the present invention is practicable even with a magnetic disk medium, magnetic tape or similar medium accommodated in a cartridge.

What is claimed is:

1. An external storage device operable with a plurality of cartridges each accommodating a storage medium, comprising:
   a first plurality of racks each for receiving a plurality of cartridges via an opening thereof;
   a first plurality of drive units, each of said drive units having an opening for the ingress and egress of a storage medium, said first plurality of drive units and said first plurality of racks being stacked one over another such that the openings of said racks and said drive units lie in substantially a same first plane, which first plane is parallel to the direction in which said drive units and racks are stacked;
   a first connecting means for interconnecting said first plurality of drive units and said first plurality of racks such that the openings of said first plurality of drive units and the openings of said first plurality of racks remain in said first plane;
   a second plurality of racks each for receiving a plurality of cartridges via an opening thereof;
   a second plurality of drive units, each of said drive units having an opening for the ingress and egress of a storage medium, said second plurality of drive units and said second plurality of racks being stacked one over another such that the openings of said racks and said drive units lie in substantially a same second plane, which second plane is parallel to the direction in which said drive units and racks are stacked and parallel to said first plane; and
   a second connecting means for interconnecting said second plurality of drive units and said second plurality of racks such that the openings of said second plurality of drive units and the openings of said second plurality of racks remain in said second plane;
   wherein the openings of said first racks and first drive units face the opening of said second racks and second drive units and each of said drive units has substantially a same height and a same width as a rack.

2. A device as claimed in claim 1, wherein said first and second connecting means each comprises a connecting portion included in each of the respective first and second pluralities of drive units and racks, and a tie plate for connecting the respective drive units and racks of the respective ones of said first and second pluralities.

3. A device as claimed in claim 1, further comprising transporting means for transporting the cartridge between said recording and reproducing means and said racks.

4. A device as claimed in claim 3, wherein said transporting means comprises:
a picker mechanism for holding the cartridge;
first drive means for rotating said picker mechanism in a front-and-rear direction;
second drive means for turning over said picker mechanism; and
third drive means for moving said picker mechanism in an up-and-down direction.

5. A device as claimed in claim 1, wherein said recording and reproducing means, said racks and said connecting means constitute a mechanical section included in said device;
said device further comprising a control section for controlling an operation of said mechanical section and sending data to be recorded or receiving reproduced data to or from said recording and reproducing means.

6. A device as claimed in claim 5, further comprising:
a partition isolating a space accommodating said mechanical section and a space accommodating said control section and having a portion for ventilation; and
cooling means for sucking air from the outside of said device, introducing the air into said control section via said mechanical section and said portion for ventilation of said partition, and discharging the air to the outside of said device.

7. A device as claimed in claim 6, wherein said cooling means comprises a fan for sucking air via a filter and a fan for discharging the air.

* * * * *

UNITED STATES PATENT AND TRADEMARK OFFICE
CERTIFICATE OF CORRECTION

PATENT NO.   : 5,373,489
DATED        : December 13, 1994
INVENTOR(S)  : Kouchi Sato et al.

It is certified that error(s) appears in the above-identified patent and that said Letters Patent is hereby corrected as shown below:

Col. 3, line 21, delete "shafts" and insert --studs--;

line 29, delete "39b" and insert --30b--.

Col. 4, line 35, delete "A" and insert --As--.

Col. 5, line 31, before "side" insert --rear--.

Col. 6, line 9, delete "322g" and insert --32g--.

Signed and Sealed this

Second Day of May, 1995

Attest:

BRUCE LEHMAN

Attesting Officer

Commissioner of Patents and Trademarks